US009176880B2

(12) United States Patent
Lee et al.

(10) Patent No.: US 9,176,880 B2
(45) Date of Patent: Nov. 3, 2015

(54) CACHE MEMORY SYSTEM FOR TILE BASED RENDERING AND CACHING METHOD THEREOF

(71) Applicants: SAMSUNG ELECTRONICS CO., LTD., Suwon-si (KR); Industry-Academia Cooperation Group of Sejong University, Seoul (KR)

(72) Inventors: Won Jong Lee, Seoul (KR); Sang Oak Woo, Anyang (KR); Seok Yoon Jung, Seoul (KR); Woo Chan Park, Seoul (KR); Young Sik Kim, Seoul (KR)

(73) Assignees: Samsung Electronics Co., Ltd., Suwon-si (KR); Industry-Academia Cooperation Group of Sejong University, Seoul (KR)

( * ) Notice: Subject to any disclaimer, the term of this patent is extended or adjusted under 35 U.S.C. 154(b) by 224 days.

(21) Appl. No.: 13/652,894

(22) Filed: Oct. 16, 2012

(65) Prior Publication Data

US 2013/0097386 A1    Apr. 18, 2013

(30) Foreign Application Priority Data

Oct. 17, 2011    (KR) .................. 10-2011-0105939

(51) Int. Cl.
   *G06F 12/08*    (2006.01)
   *G06F 12/12*    (2006.01)
   *G06T 1/60*    (2006.01)
(52) U.S. Cl.
   CPC .......... *G06F 12/0864* (2013.01); *G06F 12/126* (2013.01); *G06T 1/60* (2013.01); *Y02B 60/1225* (2013.01)

(58) Field of Classification Search
   CPC .................. G06F 12/08; G06F 12/126
   USPC ............ 711/3, 133, 108, 118, 122, 128, 144, 711/E12.018, E12.043; 712/239; 365/49.17, 189.02
   See application file for complete search history.

(56) References Cited

U.S. PATENT DOCUMENTS 5,235,697 A * 8/1993 Steely et al. .................. 711/137
5,386,547 A * 1/1995 Jouppi .......................... 711/122
(Continued)

FOREIGN PATENT DOCUMENTS

JP    2008-530657    8/2008
JP    2010-518487    5/2010
(Continued)

OTHER PUBLICATIONS

Jaleel et al, "Achieving Non-Inclusive Cache Performance with Inclusive Caches, Temporal Locality Aware (TLA) Cache Management Policies", Microarchitecture (MICRO), 2010 43rd Annual IEEE/ACM International Symposium, Dec. 4-8, 2010, pp. 151-162.*

*Primary Examiner* — Cheng-Yuan Tseng
*Assistant Examiner* — Kamal K Dewan
(74) *Attorney, Agent, or Firm* — NSIP Law (57) ABSTRACT

A cache memory system and a caching method for a tile-based rendering may be provided. Each of cache lines in the cache memory system may include delayed-replacement information. The delayed-replacement information may indicate whether texture data referred to at a position of an edge of a tile is included in a cache line. When a cache line corresponding to an access-requested address is absent in the cache memory system, the cache memory system may select and remove a cache line to be removed from an associative cache unit, based on delayed-replacement information.

13 Claims, 6 Drawing Sheets

(56) References Cited

U.S. PATENT DOCUMENTS

| | | | |
|---|---|---|---|
| 5,526,508 A * | 6/1996 | Park et al. | 711/122 |
| 5,886,706 A * | 3/1999 | Alcorn et al. | 345/582 |
| 5,987,567 A * | 11/1999 | Rivard et al. | 345/552 |
| 6,510,493 B1 * | 1/2003 | Liu et al. | 711/133 |
| 6,744,438 B1 * | 6/2004 | Baldwin | 345/552 |
| 7,948,498 B1 * | 5/2011 | Minkin | 345/552 |
| 2004/0103251 A1 * | 5/2004 | Alsup | 711/122 |
| 2005/0223173 A1 * | 10/2005 | Yamazaki | 711/128 |
| 2006/0179231 A1 * | 8/2006 | Briggs et al. | 711/136 |
| 2008/0183967 A1 * | 7/2008 | Speier et al. | 711/122 |
| 2011/0164038 A1 * | 7/2011 | Jung et al. | 345/420 |
| 2013/0151777 A1 * | 6/2013 | Daly et al. | 711/122 |

FOREIGN PATENT DOCUMENTS

| | | |
|---|---|---|
| KR | 10-2009-0097899 | 9/2009 |
| KR | 10-2011-0019764 | 2/2011 |

* cited by examiner

CACHE MEMORY SYSTEM FOR TILE BASED RENDERING AND CACHING METHOD THEREOF

CROSS-REFERENCE TO RELATED APPLICATIONS

This application claims the priority benefit of Korean Patent Application No. 10-2011-0105939, filed on Oct. 17, 2011, in the Korean Intellectual Property Office, the disclosure of which is incorporated herein by reference.

BACKGROUND

1. Field

Example embodiments relate to a cache memory system and a caching method, and particularly, to a cache memory system and a caching method for a tile-based rendering.

2. Description of the Related Art

An object-based rendering (OBR) or a tile-based rendering (TBR) may be used for rendering an image.

The OBR scheme may be utilized as an important algorithm by a desktop graphic processing unit (GPU), since the OBR has intuitive processing, and designing of hardware for the OBR is easy.

The OBR may perform rendering based on an object. Accordingly, the OBR may induce a random access to an external memory, for example, a dynamic random access memory (DRAM) for each pixel in a pixel pipeline end.

The TBR may divide a screen area into tiles, and may perform rendering based on a tile. According to the TBR, an external memory may be accessed once per tile. The tiles may be rendered using a quick internal memory, and a rendered result may be transmitted to an external memory.

Therefore, the OBR may be at a disadvantage when compared to the TBR, in terms of power consumption and memory consumption.

SUMMARY

The foregoing and/or other aspects are achieved by providing a cache memory system, the system including a first associative cache unit to simultaneously search for a cache line corresponding to an access-requested address from one or more first cache lines, and a second associative cache unit to store one or more second cache lines, and to simultaneously search for a cache line corresponding to the access-requested address from the second cache lines, and the first associative cache unit includes delayed-replacement information for each of the first cache lines, and the first associative cache unit selects and removes one cache line from among the first cache lines based on the delayed-replacement information for the first cache lines when the cache line corresponding to the access-requested address is absent in the first associative cache unit and the second associative cache unit.

The delayed-replacement information may indicate whether texture data that is referred to at a position of an edge of a tile is included in a cache line.

When the cache line corresponding to the access-requested address is absent in the first associative cache unit and the second associative cache unit, the first associative cache unit may search for a cache line that is un-accessed for a longest period of time from among the first cache lines, and may move the retrieved (or searched) cache line to the second associative cache unit when a value of delayed-replacement information for the retrieved (or searched) cache line is a first predetermined value.

When the value of the delayed-replacement information for the retrieved cache line is a second predetermined value, and a number of times that the retrieved cache line is excluded from the searching is less than or equal to a third predetermined value, the first associative cache unit may re-search for a cache line that is un-accessed for a longest period of time from among cache lines of which values of delayed-replacement information are the first predetermined value among the first cache lines, and may move the retrieved cache line to the second associative cache unit.

When the cache line corresponding to the access-requested address is absent in the first associative cache unit and the second associative cache unit, the first associative cache unit may search for a cache line that is un-accessed for a longest period of time from among the first cache lines, may select one of the second associative cache unit and an external memory of the cache memory system, based on a value of delayed-replacement information for the retrieved cache line, and may move the retrieved cache line to the selected external memory or the selected second associative cache unit.

The second associative cache unit may include a plurality of sub-associative cache units, and the first associative cache unit may search for a cache line that is un-accessed for a longest period of time from among the first cache lines when the cache line corresponding to the access-requested address is absent in the first associative cache unit and the second associative cache unit, may select one of the plurality of sub-associative cache units based on a value of delayed-replacement information for the retrieved cache line, and may move the selected sub-associative cache unit to the selected sub-associative cache unit.

Each of the plurality of sub-associative cache units may store a different number of cache lines.

The first associative cache unit may include one set or more, each set stores k cache lines each, and the first cache lines correspond to k cache lines stored in a set corresponding to the access-requested address.

The foregoing and/or other aspects are achieved by providing a caching method, the method including simultaneously searching, by a first associative cache unit, for a cache line corresponding to an access-requested address from among one or more first cache lines, the first associative cache unit including delayed-replacement information for each of the first cache lines, simultaneously searching, by a second associative cache unit storing second cache lines, for a cache line corresponding to the access-requested address from second cache lines, selecting, by the first associative cache unit, one of the first cache lines, based on delayed-replacement information for the first cache lines when the cache line corresponding to the access-requested address is absent in the first associative cache unit and the second associative cache unit, and removing, by the first associative cache unit, the selected cache line from the first associative cache unit, and the first associative cache unit uses the delayed-replacement information for the first cache lines to select one of the first cache lines and to remove the selected cache line.

The selecting may include searching, by the first associative cache unit, for a cache line that is un-accessed for a longest period of time from among the first cache lines.

The removing may include moving, by the first associative cache unit, the retrieved cache line to the second associative cache unit when a value of delayed-replacement information for the retrieved cache line is a first predetermined value.

The selecting may further include re-searching, by the first associative cache unit, for a cache line that is un-accessed for a longest period of time from among cache lines of which values of delayed-replacement information is the first predetermined value among the first cache lines when the value of the delayed-replacement information for the retrieved cache line is a second predetermined value and a number of times that the retrieved cache line is excluded from the searching is less than or equal to a third predetermined value.

The removing may further include moving, by the first associative cache unit, the retrieved cache line to the second associative cache unit when the value of the delayed-replacement information for the retrieved cache line is the second predetermined value and the number of times that the retrieved cache line is excluded from the searching is less than or equal to the third predetermined value.

The removing may include selecting, by the first associative cache unit, one of the second associative cache unit and an external memory of a cache memory system, based on a value of delayed-replacement information for the retrieved cache line, and moving, by the first associative cache unit, the retrieved cache line to the selected external memory or the selected second associative cache unit.

The removing may include selecting, by the first associative cache unit, one of a plurality of sub-associative cache units based on a value of delayed-replacement information for the retrieved cache line, and moving, by the first associative cache unit, the retrieved cache line to the selected sub-associative cache unit, and the second associative cache unit includes the plurality of sub-associative cache units.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to the like elements throughout. Embodiments are described below to explain the present disclosure by referring to the figures.

Figure 1:
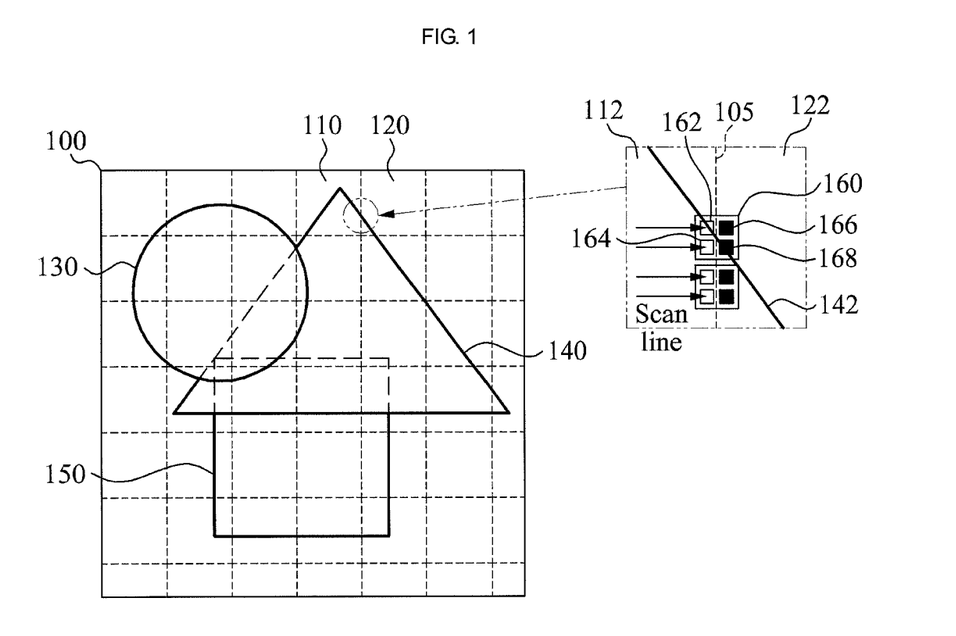
FIG. 1 illustrates an edge effect according to example embodiments.

FIG. 1 illustrates an edge effect according to example embodiments.

A tile-based rendering (TBR) divides a screen area 100, that is, a frame, into a plurality of tiles. Referring to FIG. 1, the screen area 100 may be divided into tiles in a configuration of 7 rows×7 columns. In the screen area 100 of FIG. 1, three objects, that is, a first object 130, a second object 140, and a third object 150, are included as an aspect of the present embodiment.

In FIG. 1, a portion 112 of a first tile 110 and a portion 122 of a second tile 120 are shown in a magnified form. An edge 105 exists between the first tile 110 and the second tile 120. A portion 142 of the second object 140 may be included in the first tile 110 and the second tile 120.

A graphic processing unit (GPU) may perform rendering of each tile, for example, the first tile 110 or the second tile 120.

When the GPU performs rendering of the first tile 110, the GPU may perform rendering of a triangle, that is, the second object 140, included in the tiles, along a scan line. When the GPU processes pixels or fragments in the first tile 110, the GPU may request data, for example, texture data, from an external memory (not shown). The requested data may be stored in a cache (not shown), so that the data may be reused afterward.

Here, data may be requested based on a block unit. A block 160 may include a plurality of texels. Referring to FIG. 1, the block 160 includes four texels 162, 164, 166, and 168 in a configuration of 2 rows×2 columns. A magnitude of a block may be arbitrary and a shape of the block is not limited to that of a regular square. A texel may be a single pixel. A single texel may include at least one byte or at least one word.

Among the texels 162, 164, 166, and 168 included in the block 160, the texels 166 and 168 included in the second tile 120 that is adjacent to the first tile 110 may not be used in performing rendering of the first tile 110. That is, when the block 160 exists at an edge between the first tile 110 that is rendered and the second tile 120 that is adjacent to the first tile 110, data associated with pixels in the second tile 120, for example, the texels 166 and 168, may not be used while the first tile 110 is being rendered.

Although the first tile 110 and the second tile 120 are close to each other, it is not guaranteed that the second tile 120 is processed immediately after processing of the first tile 110, such as, rendering of the first tile 110. In particular, it is not guaranteed when the first tile 110 and the second tile 120 are close to each other in the vertical direction. Accordingly, although the block 160 is stored in a cache while the first tile 110 is being processed, texels 166 and 168 in the second tile 120 may not be referred to for a long period of time, that is, until the second tile 120 is processed. Accordingly, when new data is stored in the cache (not shown), data of the texels 166 and 168 may be removed from the cache. In a case where the data of the texels 166 and 168 is removed from the cache, the block 160 may need to be read again from the external memory and stored again in the cache to process the second tile 120 afterward.

As described in the foregoing, the edge effect may refer to an effect that forces a cache (not shown) to fetch even a large portion of texture data that is not used within a short period of time since a size of a block is large when a texture exists in a boundary between tiles For example, when texture-mapping is performed with respect to fragments existing in a boundary between tiles, a probability that the cache reuses data of a texel included in a tile different from a tile currently being processed among data that is read from a memory and stored in the cache, that is, among data of a block, may be significantly low. The data that is not to be used, that is, the data of the texel in the tile different from the tile currently being processed may occupy the cache and thus, an efficiency of the cache may be decreased. That is, as a number of blocks included in an edge between different tiles increases, a utilization of the cache that utilizes a reusability of data may decrease. Here, the decrease in the utilization may negatively affect a performance of the GPU or a system, and may induce a relatively wide texture bandwidth when compared to an object-based rendering (OBR).

When data of the block 160 is stored in the cache for a relatively long period of time, the data of the block 160 may continuously exist in the cache until the second tile 120 is processed. In this example, the data of the texels 166 and 168 in the second tile 120 may be accessed directly through the cache, and a cache miss may not occur and thus, the utilization of the cache may increase.

The cache may use a cache line as a unit for storing data. That is, storing of certain data, for example, data of the block 160 or data of texels 166 and 168, in the cache for a relatively long period of time may indicate that a cache line corresponding to the certain data is stored in the cache for a relatively long period of time. To store a certain cache line in the cache for a relatively long period of time, the cache line may need to include information that is referred to for determining whether to perform replacement. The information referred to for determining whether to perform replacement may be referred to as delayed-replacement information. That is, each cache line may include delayed-replacement information, and the delayed-replacement information may refer to information that is used by the cache to select a cache line to be changed from among a plurality of cache lines.

Here, the delayed-replacement information may indicate whether a corresponding cache line includes texture data referred to at a position of an edge of a tile. That is, the delayed-replacement information for the cache line may indicate whether the cache line includes texture data referred to at the position of the edge of the tile, that is, data of a block included in at least two tiles, and the cache may determine a cache line to be changed from among one or more cache lines based on delayed-replacement information for each of the cache lines. Accordingly, the texture data referred to at the position of the edge of the tile may be stored in the cache for a relatively long period of time.

The delayed-replacement information may be formed of one bit. When a value of a bit of delayed-replacement information is '0' or 'false', the delayed-replacement information indicates that a corresponding cache line may not need to be stored in the cache for a relatively long period of time. Conversely, when a value of a bit of delayed-replacement information is '1', a value different from '0', or 'true', the delayed-replacement information may indicate that a corresponding cache line needs to be stored in the cache for a relatively long period of time.

At least one bit included in the delayed-replacement information may be referred to as an E-bit. Here, 'E' may denote an edge. That is, the E-bit of a cache line may indicate whether the cache line includes texture data referred to at a position of an edge of a tile. When a value of the E-bit is '1', the value indicates 'true', that is, that the texture data referred to at the position of the edge of the tile is included in the cache line. When a value of the E-bit is '0', the value indicates 'false', that is, that the texture data referred to at the position of the edge of the tile is absent in the cache line.

When texture data stored in the external memory is stored in a cache memory since a cache miss occurs while texture-mapping is being performed with respect to a position of an edge of a tile, an E-bit of a cache line storing the texture data may be set to '1'. When data different from texture data referred to at an edge between tiles is stored in the cache memory, an E-bit of a cache line storing the data may be set to '0'.

The cache line of which the E-bit is set to '1' may be stored in the cache, as long as possible, by increasing a priority of the cache line.

Figure 2:
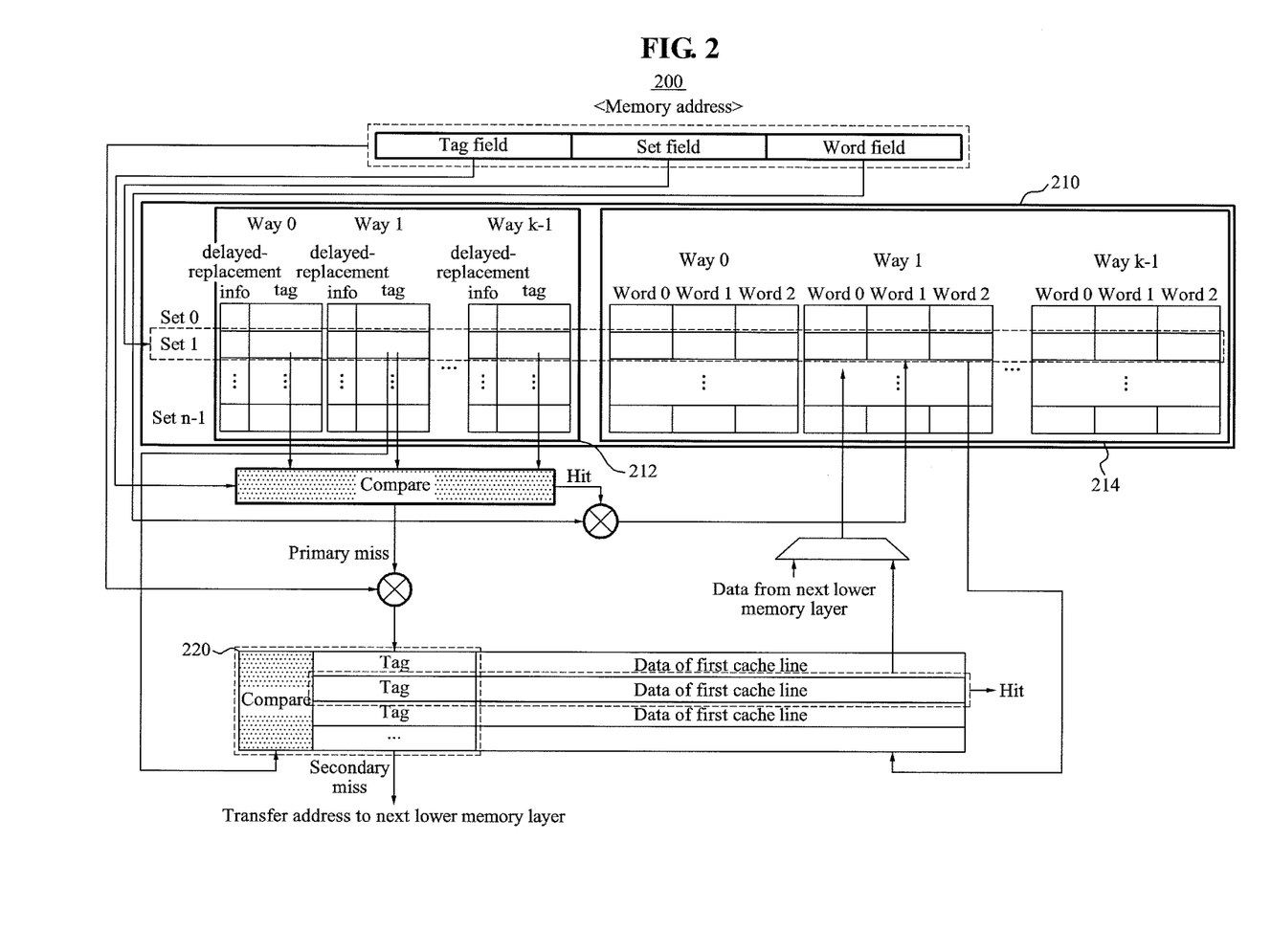
FIG. 2 illustrates a cache memory system according to example embodiments.

FIG. 2 illustrates a cache memory system 200 according to example embodiments.

The cache memory system 200 may include a first associative cache unit 210 and a second associative cache unit 220.

The cache memory system 200 may receive an address of an access-requested memory, hereinafter, an access-requested address. An address may include a tag field or tag index, a set field, and a word field or combination thereof.

The first associative cache unit 210 may include one or more set. In FIG. 2, the first associative cache unit 210 may include n sets including a set 0 through a set n−1. The set field in the address may indicate an area where data of the address is stored in the first associative cache unit 210. For example, a value of the set field of the address is '00' as a binary number, the address may correspond to the set 0 from among four sets.

Each set includes k ways including a way 0 through a way k−1. A way may include a cache line and information used for the cache line. The way may include the cache line, a tag of the cache line, and delayed-replacement information for the cache line. Here, the tag and the delayed-replacement information may be stored in a random access memory (RAM) 212, and the cache line may be stored in a data static random access memory (SRAM) 214. However, it is not limited thereto.

The cache line may include one or more words. The tag may indicate a portion, corresponding to a tag field in an address of data. The tag of the cache line may be common to all words stored in the cache line. That is, the words in the cache line may be words corresponding to k addresses having the same value of the tag field and the same value of the set field.

A cache line in the first associative cache unit 210 may be selected by a set field and a tag field. Also, a word may be selected by a word field from among one or more words in the selected cache line. For example, when a value of the word field is '01' as a binary number, a word 1 from among four words in the selected cache line may be selected as a word corresponding to an access-requested data.

The second associative cache unit 220 may include one or more cache lines and a tag of the cache lines. The second associative cache unit 220 may not include a set. Accordingly, a tag of the second associative cache unit 220 may indicate a portion, corresponding to a tag field and a set field in an address of data.

Here, data of the cache line may correspond to words included in the cache line. A cache line of the second associative cache unit 220 may store the same number of words as a cache line of the first associative cache unit 210.

The cache line of the second associative cache unit 220 may be selected by a set field and a tag field, and one or more words in the cache line of the second associative cache unit 220 may be selected by a word field.

When the cache memory system 200 is requested to access data at a selected address, whether the data at the address exists in the first associative cache unit 210 may be verified.

The first associative cache unit 210 may select a set corresponding to the access-requested address, using a set field of an access-requested address. In FIG. 2, a set 1 is illustrated as a set corresponding to the access-requested address.

The first associative cache unit 210 may simultaneously search for a cache line corresponding to the access-requested address from among one or more cache lines stored in the selected set. Here, a cache line stored in the selected set corresponding to the access-requested address may be referred to as a first cache line. That is, the first associative cache unit 210 may simultaneously search for a cache line corresponding to the access-requested address from among the first cache lines. Here, 'simultaneously' may be used to indicate a meaning opposite to that of sequentially verifying of whether each of the first cache lines corresponds to the access-requested address.

The first associative cache unit 210 may simultaneously compare a value of a tag field of the access-requested address and values of tags of the first cache lines and thus, may verify whether a tag having the same value as the value of the tag field exists. When the tag having the same value as the value of the tag field exists, a cache line corresponding to the tag may include access-requested data, that is, an access-requested word. Accordingly, a cache hit may occur in the cache line corresponding to the tag having the same value. That is, the cache line corresponding to the tag having the same value may be a hit. When the tag having the same value is absent, a cache miss may occur. The cache miss may be a primary miss.

As described in the foregoing, the first associative cache unit 210 may simultaneously compare a value of a tag field and values of k tags in a set. Accordingly, the first associative cache unit 210 may be a k-way set associative cache unit.

Hereinafter, an operation of the cache memory system 200 when a hit occurs in the first associative cache unit 210 will be described.

When a hit occurs in the first associative cache unit 210, all words corresponding to a set and a tag of an access-requested address may be stored in a hit cache line. Accordingly, the first associative cache unit 210 may use a word field of the access-requested address, may select an access-requested word from among the words in the hit cache line, and may provide the selected word as access-requested data. For example, when a value of the word field is '00' as a binary number, the first associative cache unit 210 may provide word 0, that is, a first word, from among four words in the hit cache line, to a central processing unit (CPU) or a GPU, as the access-requested data.

Hereinafter, an operation of the cache memory system 200 when a primary miss occurs in the first associative cache unit 210 will be described.

When the primary miss occurs in the first associative cache unit 210, the second associative cache unit 220 may simultaneously search for a cache line corresponding to an access-requested address from among one or more cache lines stored in the second associative cache unit 220. Here, a cache line stored in the second associative cache unit 220 may be referred to as a second cache line.

The second associative cache unit 220 may simultaneously compare values of tags of the second cache lines with a value of a tag field of the access requested address or a value of a tag field and set field of the access requested address and thus, may verify whether a tag having the same value as the tag field or a tag having the same value as the tag field and the set field exists. When the tag having the same value exists, a cache line corresponding to the tag may include access-requested data. Accordingly, a cache hit may occur in the cache line corresponding to the tag having the same value. That is, the cache line corresponding to the tag having the same value may be hit. When the tag having the same value is absent, a cache miss may occur. The cache miss may be a secondary miss, and may be a final cache miss occurring in the cache memory system 200.

Hereinafter, an operation of the cache memory system 200 when a primary miss occurs in the first associative cache unit 210 and a hit occurs in the second associative cache unit 220 will be described.

Referring to FIG. 2, a hit occurs in a second cache line.

When a hit occurs in the second associative cache unit 220, the first associative cache unit 220 may select an access-requested word from among words in a hit cache line, using a word field of an access-requested address, and may provide, to a CPU or a GPU, the selected word as access-requested data.

In this example, the hit cache line may be replaced with one of the first cache lines in the first associative cache unit 210. That is, the hit cache line may be moved to a position of the cache line selected from among the first cache lines, and the selected cache line may be moved to a position of the hit cache line. In the switching, a method to be described with reference to FIG. 3 will be used to select one of the first cache lines.

Hereinafter, an operation of the cache memory system 200 when a primary miss and a secondary miss occur will be described.

When a cache line corresponding to an access-requested address is absent in the first associative cache unit 210 and the second associative cache unit 220, the access-requested address is transferred to a next lower memory layer, and data at the access-requested address may be read from the next lower memory layer, for example, an external memory. In this example, the data corresponding to the access-requested address may be read along with data at an address having the same tag field and the same set field as the data. The cache memory system 200 may use a cache line as a unit for storing data. Accordingly, although an access to a single word is requested, words belonging to the same cache line as the access-requested word, that is, words having the same tag field value and the same set field value as the access-requested word, may be read from the next lower memory layer and may be stored in a cache line. A newly stored cache line due to a cache miss may be referred to as a third cache line.

To store the third cache line, the first associative cache unit 210 may select and remove one from among the first cache lines. That is, the first associative cache unit 210 may store the third cache line in a position of the removed cache line. For example, the first associative cache unit 210 may select and remove one from among the first cache lines, based on replacement information for the first cache lines. Here, 'removing' may indicate moving of the selected cache line from the first associative cache unit 210 to the second associative cache unit 220 or to the external memory of the cache memory system 200.

A method of selecting and removing a cache line based on replacement information will be described in detail with reference to FIGS. 3 through 5.

The cache line removed from the first associative cache unit 210 may be moved to a position of a cache line selected from among the second cache lines of the second associative cache unit 220. That is, the second associative cache unit 220 may store a cache line selected, as a victim, from the first associative cache unit 210. Accordingly, the second associative cache unit 220 may be a victim cache. Also, the second associative cache unit 220 may simultaneously search for a cache line corresponding to an access-requested address from among all cache lines stored in the second associative cache unit 220. Accordingly, the second associative cache unit 220 may be a full-associative victim cache.

The second associative cache unit 220 may use a first-in first-out (FIFO) scheme or a least recently used (LRU) scheme, to select one of the second cache lines.

When the FIFO scheme is used, the second associative cache unit 220 may select a cache line stored for a longest time in the second associative cache unit 220 from among the second cache lines, and may remove the selected cache line so as to store a victim cache line transmitted from the first associative cache unit 210.

When the LRU scheme is used, the second associative cache unit 220 may select a cache line referred to at an earliest point in time from among the second cache lines, and may remove the selected cache line so as to store a victim cache line transmitted from the first associative cache unit 210.

When a selected cache line is removed from the second associative cache unit 220, values of words included in the cache line to be removed may be transferred to the next lower memory layer. In this instance, the next lower memory layer may update values of stored words, corresponding to the cache line removed from the second associative cache unit 220, based on the transferred values.

Figure 3:
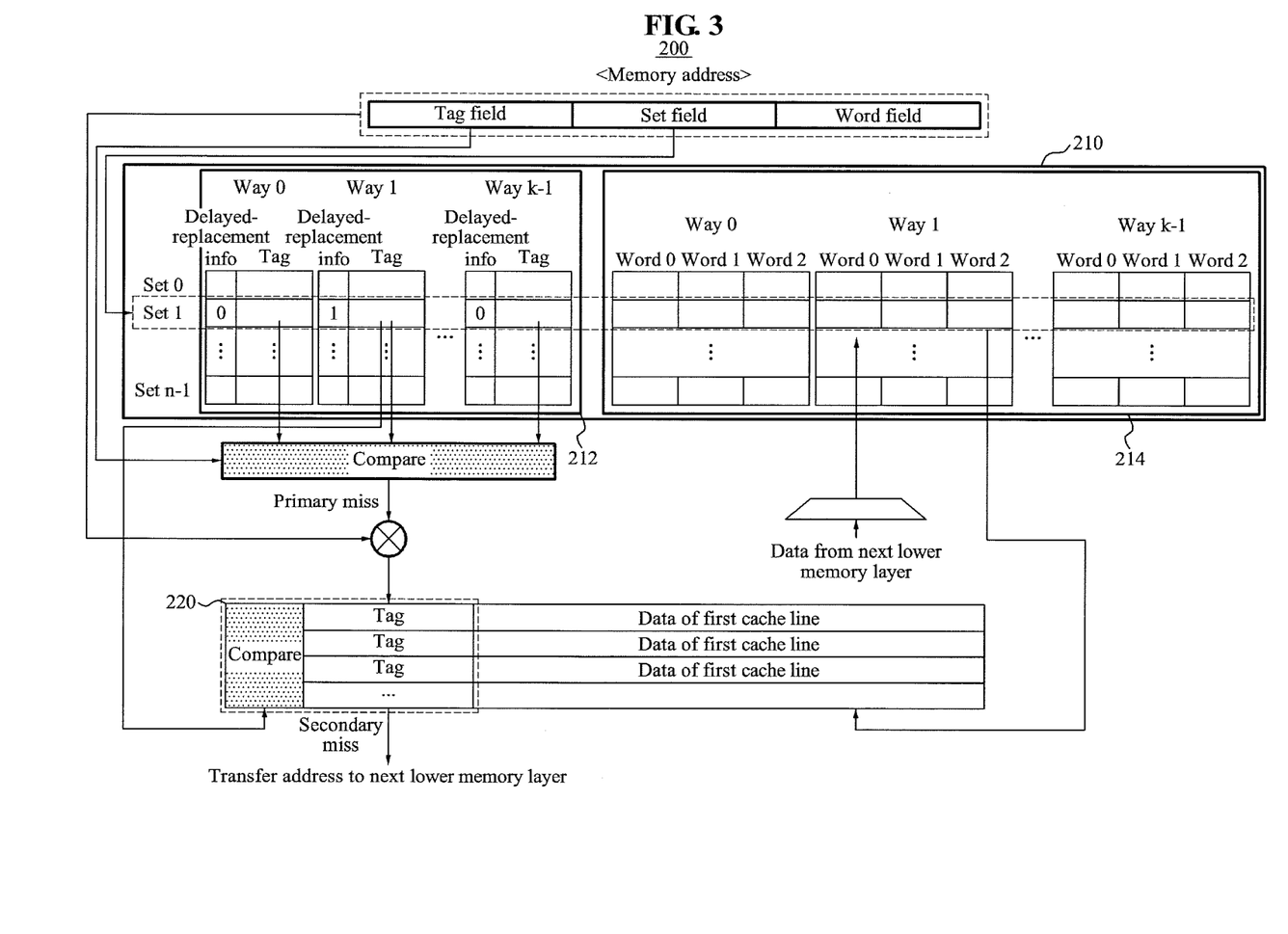
FIG. 3 illustrates a method of selecting a cache line to be removed according to example embodiments.

FIG. 3 illustrates a method of selecting a cache line to be removed according to example embodiments.

Referring to FIG. 3, a primary miss and a secondary miss may occur. An access-requested address may indicate a set 1. Accordingly, the first cache lines of FIG. 2 may be k cache lines in the set 1.

When a cache line corresponding to the access-requested address is absent in the first associative cache unit 210 and the second associative cache unit 220, the first associative cache unit 210 may select a cache line to be removed, based on the LRU scheme. That is, the first associative cache unit 210 may select a cache line accessed at an earliest point in time from among the first cache lines, as the cache line to be removed.

The first associative cache unit 210 may search for a cache line un-accessed for a longest time, and may move the retrieved cache line to the second associative cache unit 220 when a value of delayed-replacement information, for example, an E-bit, of the retrieved cache line is a first predetermined value. Here, the first predetermined value may be a value, for example, '0', indicating that a cache line may not need to be stored in a cache for a relatively long period of time. That is, when the cache line selected to be removed is the cache line that may not need to be stored for a relatively long period of time, the first associative cache unit 210 may move the retrieved cache line directly to the second associative cache unit 220, as a victim.

When the value of the delayed-replacement information for the retrieved cache line is a second predetermined value, and a number of times that the retrieved cache line is excluded from the searching is less than or equal to a third predetermined value, the first associative cache unit 210 may re-search for a cache line un-accessed for a longest period of time from among cache lines of which delayed-replacement information is the first predetermined value among the first cache lines, and may move the retrieved cache line to the second associative cache unit 220. Here, the second predetermined value may be a value, for example, '1' or a value different from '0', indicating that a cache line may need to be stored in a cache for a relatively long period of time. That is, when the cache line selected to be removed is the cache line that may need to be stored for a relatively long period of time, the first associative cache unit 210 may reselect one of cache lines that may not need to be stored for a long period of time as a cache line to be removed, instead of the selected cache line, and may move the reselected cache line to the second associative cache unit 220 as a victim.

For example, when a cache line of a way 1 is selected as a cache line un-accessed for a longest period of time from among the first cache lines, a value of delayed-replacement information for the way 1 may be '1', that is, a value indicating that a cache line needs to be stored for a relatively long period of time. Accordingly, a cache line un-accessed for a longest period of time may be reselected from among cache lines of which values of delayed-replacement information are different from '1', as a cache line to be removed.

In this example, a cache line of which a value of delayed-replacement information is the second predetermined value may not be always excluded from a target to be moved. Accordingly, the first associative cache unit 210 may limit, to the third predetermined value, a maximum number of times that a certain cache line is excluded from a target to be moved. When a number of times that a certain cache line is excluded from the target to be removed is equal to the third predetermined value, the certain cache line may not be excluded from the target to be removed any longer.

To exclude a certain cache line from the target to be moved, the first associative cache unit 210 may count a number of times that a cache line is excluded from the target to be moved, for each cache line, and may store information associated with the count, for example, an exclusion count bit.

A method of limiting the number of exclusions may be embodied by using a value of delayed-replacement information. For example, when the third predetermined value is 3 and a cache line is stored in the first associative cache unit 210, delayed-replacement information for the cache line may be set to 3. Subsequently, when the first associative cache unit 210 selects the cache line as a cache line to be removed, the first associative cache unit 210 may exclude the cache line from the target to be removed, and may decrease the value of the delayed-replacement information for the cache line by 1. When the cache line is excluded from the target to be moved three times, the value of the delayed-replacement information for the cache line may become 0 and thus, the cache line may not be excluded from the target to be moved, any longer. That is, when a certain cache line is excluded from the target to be moved, the certain cache line may be decreased by 1 for each time and thus, the certain cache line may be regarded as a cache line that may not need to be stored for a long period of time.

Figure 4:
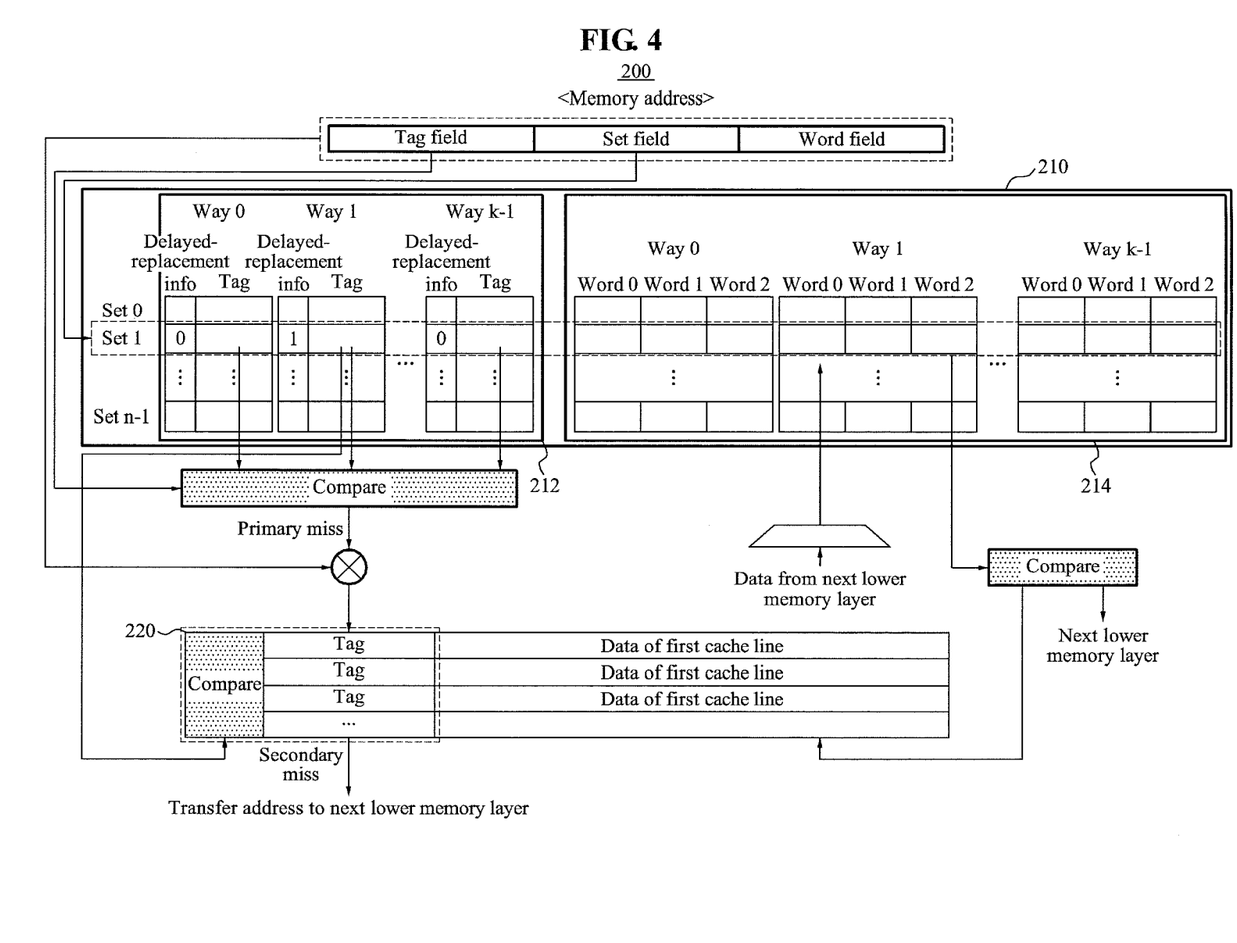
FIG. 4 illustrates a method of removing a selected cache line according to example embodiments.

FIG. 4 illustrates a method of removing a selected cache line according to example embodiments.

Referring to FIG. 4, a primary miss and a secondary miss may occur. An access-requested address may indicate a set 1. Accordingly, the first cache lines of FIG. 2 may be k cache lines in the set 1.

When a cache line corresponding to the access-requested address is absent in the first associative cache unit 210 and the second associative cache unit 220, the first associative cache unit 210 may select one of the first cache lines. The first associative cache unit 210 may search for a cache line un-accessed for a longest period of time from among the first cache lines. The first associative cache unit 210 may select one of an external memory of the cache memory system 200 and the second associative cache unit 220, based on a value of delayed-replacement information for the retrieved cache line, and may move the retrieved cache line to the selected one from the external memory or the second associative cache unit 220.

The first associative cache unit 210 may move the retrieved cache line to the external memory when the value of the delayed-replacement information for the retrieved cache line is a first predetermined value. When the retrieved cache line is moved to the external memory, the external memory may update values of words, corresponding to the retrieved cache line, stored in the external memory, using values of words of the retrieved cache line.

The first associative cache unit 210 may move the retrieved cache line to a position of the one selected from among the second cache lines of the second associative cache unit 220 when the value of the delayed-replacement information for the retrieved cache line is a second predetermined value, similar to when a primary miss and a secondary miss occurs as described in the foregoing with reference to FIG. 3.

Accordingly, when the value of the delayed-replacement information for the cache line is the first predetermined value, the cache line may be moved to the external memory immediately when the cache line is removed from the first associative cache unit 210. Conversely, when the value of the delayed-replacement information is the second predetermined value, the cache line may be moved to the second associative cache unit 220 when the cache line is removed from the first associative cache unit 210. Accordingly, the second associative cache unit 220 may store cache lines of which values of delayed-replacement information are the second predetermined value. That is, the second associative cache unit 220 may store only cache lines that need to be stored for a long period of time. The cache lines stored in the second associative cache unit 220 may be moved again to the first associative cache unit 210 afterward and thus, a cache line of which a value of delayed-replacement information is the second predetermined value may be stored in the cache memory system 200 for a relatively long period of time.

Figure 5:
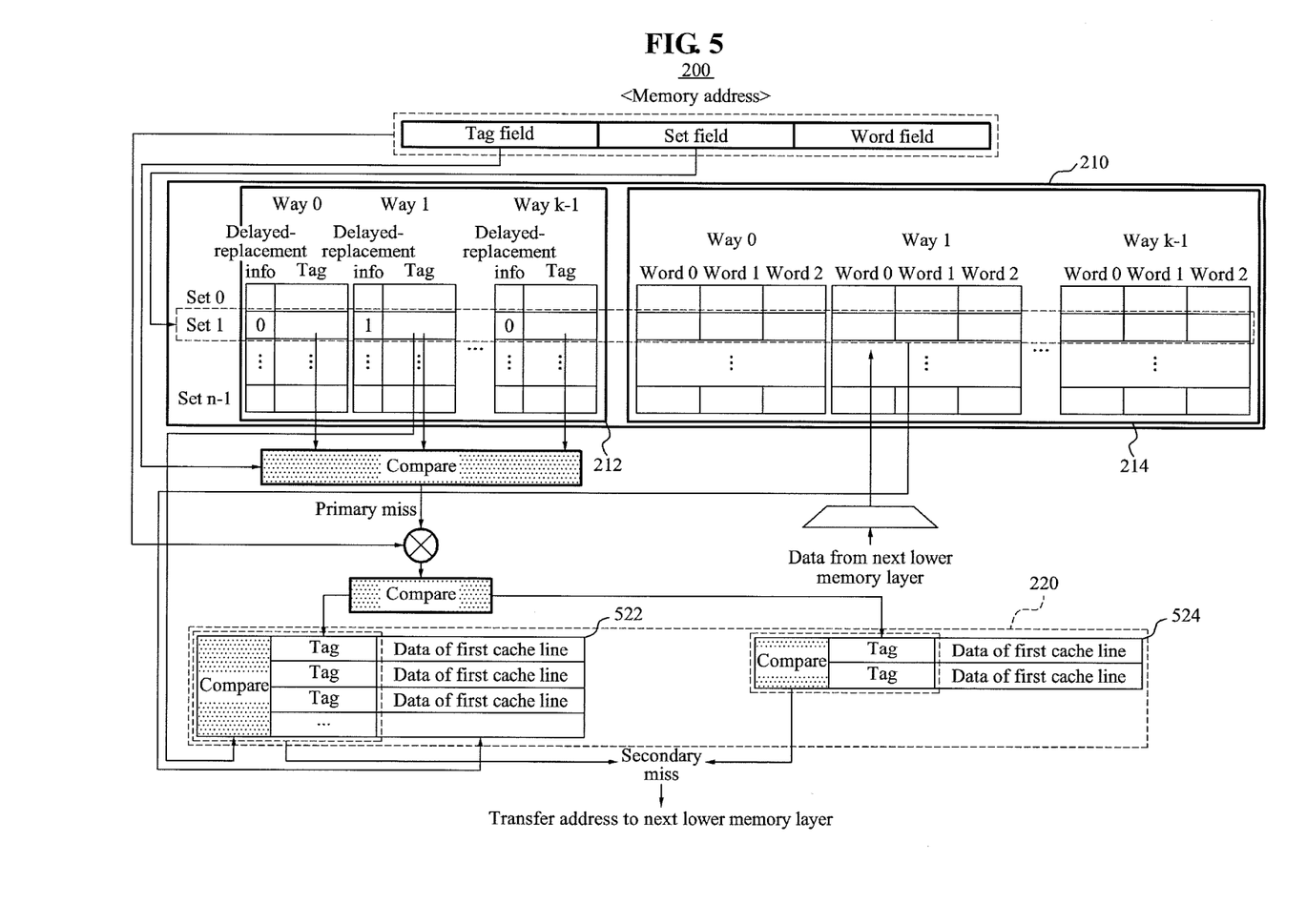
FIG. 5 illustrates a method of moving a removed cache line to one of a plurality of sub-associative cache units according to example embodiments.

FIG. 5 illustrates a method of moving a removed cache line to one of a plurality of sub-associative cache units according to example embodiments The second associative cache unit 220 may include the plurality of sub-associative cache units, for example, a first sub-associative cache unit 522 and a second sub-associative cache unit 524. Each of the plurality of sub-associative cache units may operate as the second associative cache unit 220. Referring to FIG. 5, the sub-associative cache unit 522 and the sub-associative cache unit 524 may exist. That is, two sub-associative cache units exist.

Referring to FIG. 4, a primary miss and a secondary miss occur. Here, an occurrence of the secondary miss may indicate that a cache line corresponding to a set field and a tag field is absent in the first associative cache unit 210 and the plurality of sub-associative cache units 522 and 524. An access-requested address may indicate a set 1. Accordingly, the first cache lines of FIG. 2 may be k cache lines in the set 1.

When a cache line corresponding to the access-requested address is absent in the first associative cache unit 210 and the second associative cache unit 220, the first associative cache unit 210 may search for a cache line un-accessed for a longest period of time from among the first cache lines, may select one of the plurality of sub-associative cache units 522 and 524, based on a value of delayed-replacement information for the retrieved cache line, and may move the retrieved cache line to the plurality of cache lines 522 and 524.

The first associative cache unit 210 may move the retrieved cache line to the second sub-associative cache unit 524 when the value of the delayed-replacement information for the retrieved cache line is a first predetermined value. Also, the first associative cache unit 210 may move the retrieved cache line to the first sub-associative cache unit 522 when the value of the delayed-replacement information for the retrieved cache line is a second predetermined value.

Each of the plurality of sub-associative cache units 522 and 524 may store a different number of cache lines. A number of cache lines that the first sub-associative cache unit 522 is able to store may be greater than a number of cache lines that the second sub-associative cache unit 524 is able to store. In this example, a cache line stored in the first sub-associative cache unit 522, that is, a cache line of which a value of delayed-replacement information is the second predetermined value, may be stored in the cache memory system 200 for a relatively longer period of time than a cache line stored in the second sub-associative cache unit 524, that is, a cache line of which a value of delayed-replacement information is the first predetermined value.

The cache line in the first sub-associative cache unit 522 is moved again to the first associative cache unit 210, the value of the delayed-replacement information for the cache line may become the second predetermined value. The cache line in the second sub-associative cache unit 524 is moved again to the first associative cache unit 210, the value of the delayed-replacement information for the cache line may become the first predetermined value.

Figure 6:
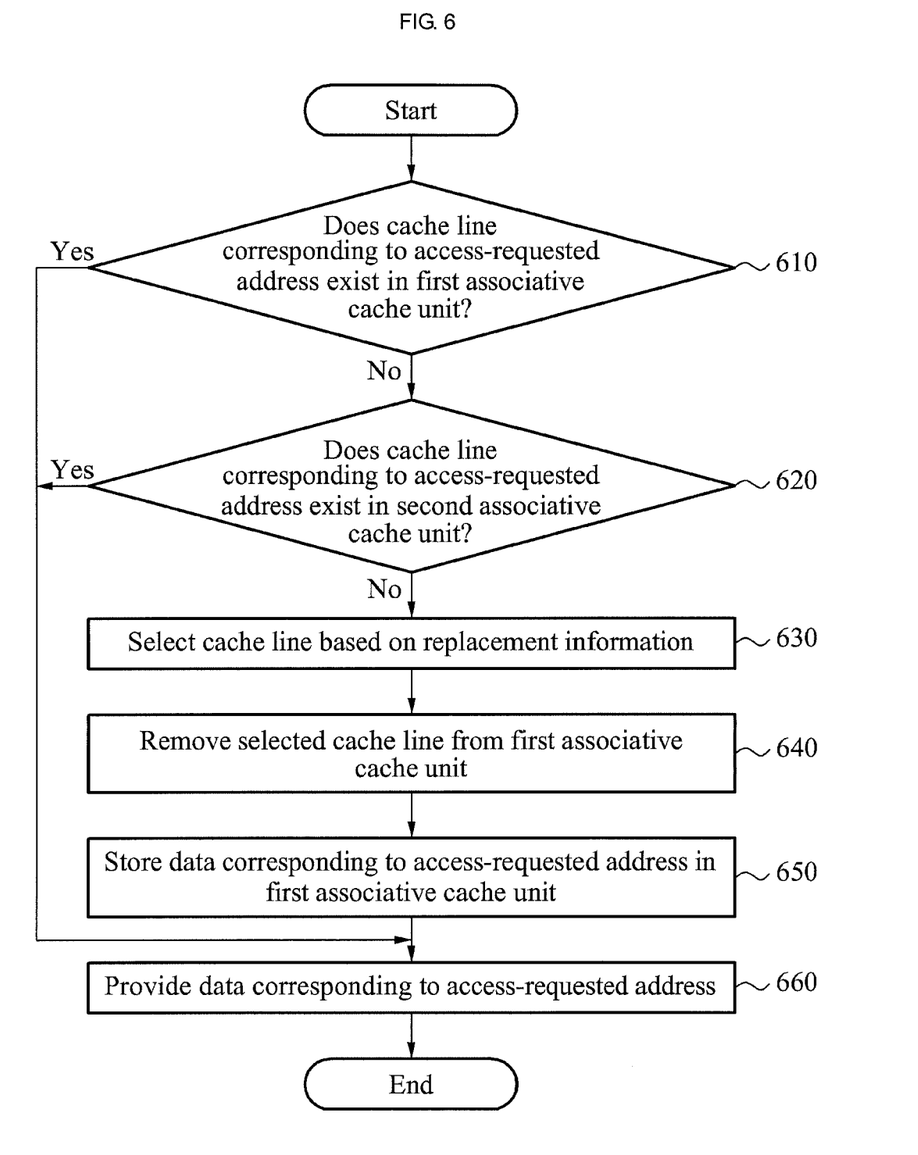
FIG. 6 illustrates a caching method of a cache memory system according to example embodiments.

FIG. 6 illustrates a caching method of the cache memory system 200 according to example embodiments.

In operation 610, the first associative cache unit 210 may simultaneously search for a cache line corresponding to an access-requested address from among one or more first cache lines.

The first associative cache unit 210 may include delayed-replacement information for each of the first cache lines.

When the cache line corresponding to the access-requested address exists in the first associative cache unit 210, the method may proceed with operation 660. When the cache line is absent, the method may proceed with operation 620.

In operation 620, the second associative cache unit 220 that stores one or more second cache lines may simultaneously search for a cache line corresponding to the access-requested address.

When the cache line corresponding to the access-requested address exists in the second associative cache unit 220, the method may proceed with operation 660. When the cache line is absent, the method may proceed with operation 630. That is, operation 630 may be performed when the cache line corresponding to the access-requested address is absent in the first associative cache unit 210 and the second associative cache unit 220.

In operation 630, the first associative cache unit 210 may select one of the first cache lines based on replacement information.

In operation 640, the first associative cache unit 210 may remove the selected cache line from the first associative cache unit 210.

The first associative cache unit 210 may use delayed-replacement information for the first cache lines to select or to remove one from among the first cache lines in operations 630 and 640.

In operation 650, the first associative cache unit 210 may store data corresponding to the access-requested address in the first associative cache unit 210. The first associative cache unit 210 may store data corresponding to the access-requested address and data included in the same cache line as the data, as a new cache line. The first associative cache unit 210 may store the new cache line in a position of the cache line removed in operation 640.

In operation 660, the first associative cache unit 210 or the second associative cache unit 220 may provide the data corresponding to the access-requested address to a processor, for example, a CPU or a GPU.

The selection in operation 630 and the removal in operation 640 may be performed in varied schemes described in the foregoing with reference to FIGS. 3 through 5.

First, a case in which the method described in the foregoing with reference to FIG. 3 is applied to the selection in operation 630 and the removal in operation 640 will be described.

In this example, operation 630 may include an operation in which the first associative cache unit 210 searches for a cache line un-accessed for a longest period of time from among the first cache lines.

When a value of delayed-replacement information for the retrieved cache line is a second predetermined value and a number of times that the retrieved cache line is excluded from the searching is less than or equal to a third predetermined value, operation 630 may further include an operation in which the first associative cache unit 210 re-searches for a cache line un-accessed for a longest period of time from among cache lines of which values of delayed-replacement information is a first predetermined value among the first cache lines.

Also, operation 640 may include an operation in which the first associative cache unit 210 moves the retrieved cache line to the second associative cache unit 220 when the value of the delayed-replacement information for the retrieved cache line is the first predetermined value.

When the value of the delayed-replacement information for the retrieved cache line is the second predetermined value and the number of times that the retrieved cache line is excluded from the searching is less than or equal to the third predetermined value, operation 640 may further include an operation in which the first associative cache unit 210 moves, to the second associative cache unit 220, a cache line retrieved by re-searching.

Subsequently, a case in which the method described in the foregoing with reference to FIG. 4 is applied to the selection in operation 630 and a removal in operation 640 will be described.

In this example, operation 630 may include an operation in which the first associative cache unit 210 searches for a cache line un-accessed for a longest period of time from among the first cache lines.

Operation 640 may include an operation in which the first associative cache unit 210 selects one of the second associative cache unit 220 and an external memory of the cache memory system 200, based on delayed-replacement information for the retrieved cache line.

Also, operation 640 may include an operation in which the first associative cache unit 210 moves the retrieved cache line to the one selected from among the second associative cache unit 220 and the external memory.

Subsequently, a case in which the method described in the foregoing with reference to FIG. 5 is applied to the selection in operation 630 and the removal in operation 640 will be described.

The second associative cache unit 220 may include the plurality of sub-associative cache units 522 and 524, and each of the plurality of sub-associative cache units 522 and 524 may store a different number of cache lines.

Operation 630 may include an operation in which the first associative cache unit 210 searches for a cache line un-accessed for a longest period of time from among the first cache lines according to an aspect of the embodiment.

Operation 640 may include an operation in which the first associative cache unit 210 selects one of the plurality of sub-associative cache units 522 and 524, based on a value of delayed-replacement information for the retrieved cache line.

Also, operation 640 may include an operation in which the first associative cache unit 210 moves the retrieved cache line to the selected sub-associative cache unit 522 or 524.

The example embodiments described with reference to FIGS. 1 through 5 may be applicable to the present embodiment and thus, detailed descriptions thereof will be omitted for conciseness.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. A cache memory system, the system comprising:
   a first associative cache unit configured to search for a cache line corresponding to an access-requested address, among a stored set of one or more first cache lines that include delayed-replacement information, wherein the delayed-replacement information indicates whether or not texture data that is referred to at a position of an edge of a tile is included in the respective cache line; and
   a second associative cache unit configured to store one or more second cache lines, and to search among the one or more second cache lines, for a cache line corresponding to the access-requested address;
   wherein the first associative cache unit is further configured to, when no cache line corresponding to the access-requested address is found in any of the first associative cache unit and the second associative cache unit:
      search for a cache line among the first cache lines, that has not been accessed for a longest period of time, based on the delayed-replacement information of the first cache lines, and
      move the cache line among the first cache lines, that has not been accessed for the longest period of time to the second associative cache unit, when a value of delayed-replacement information of the cache line that has not been accessed for the longest period of time has a first predetermined value.

2. The system of claim 1, wherein the first associative cache unit is further configured to, when the value of the delayed-replacement information of the cache line that has not been accessed for a longest period of time includes a second predetermined value, and a number of instances that the cache line that has not been accessed for a longest period of time has been excluded from the search is less than or equal to a third predetermined value:
   search for a cache line that has not been accessed for a longest period of time among the first cache lines having values of delayed-replacement information corresponding to the first predetermined value, and move the cache line among the first cache lines, that has not been accessed for a longest period of time to the second associative cache unit.

3. The system of claim 1, wherein the first associative cache unit is further configured to, when no cache line corresponding to the access-requested address is found in any of the first associative cache unit and the second associative cache unit:
search for a cache line among the first cache lines, that has not been accessed for a longest period of time,
select one of the second associative cache unit and an external memory of the cache memory system, based on a value of delayed-replacement information of the cache line among the first cache lines, that has not been accessed for a longest period of time, and
move the cache line among the first cache lines, that has not been accessed for a longest period of time, to the selected external memory or the selected second associative cache unit.

4. The system of claim 1, wherein:
the second associative cache unit includes a plurality of sub-associative cache units; and
the first associative cache unit is configured to
search for a cache line among the first cache lines, that has not been accessed for a longest period of time, when no cache line corresponding to the access-requested address is found in any of the first associative cache unit and the second associative cache unit,
select one of the plurality of sub-associative cache units, based on a value of delayed-replacement information of the cache line among the first cache lines, that has not been accessed for a longest period of time, and
move the cache line among the first cache lines, that has not been accessed for a longest period of time to the selected sub-associative cache unit.

5. The system of claim 4, wherein each of the plurality of sub-associative cache units stores a different number of cache lines.

6. The system of claim 1, wherein the first associative cache unit comprises one or more sets, each set stores k cache lines each, and the first cache lines correspond to k cache lines stored in a set corresponding to the access-requested address.

7. A caching method, the method comprising:
searching, by using a first associative cache unit storing one or more first cache lines, for a cache line among the first cache lines, wherein the cache line corresponds to an access-requested address, wherein the first associative cache unit includes, for each of the first cache lines, delayed-replacement information, and wherein the delayed-replacement information indicates whether or not texture data referred to at a position of an edge of a tile is included in the respective cache line;
searching among one or more second cache lines, by using a second associative cache unit storing the one or more second cache lines, for a cache line corresponding to the access-requested address;
wherein when no cache line corresponding to the access-requested address is found in any of the first associative cache unit and the second associative cache unit, the first associative cache unit:
searches among the first cache lines, for a cache line that has not been accessed for a longest period of time, based on the delayed-replacement information of the first cache lines, and
moves the cache line that has not been accessed for the longest period of time to the second associative cache unit, when a value of delayed-replacement information of the cache line that has not been accessed for the longest period of time has a first predetermined value.

8. The method of claim 7, wherein:
the selecting further comprises:
re-searching, by the first associative cache unit, a cache line that has not been accessed for a longest period of time among the first cache lines, having values of delayed-replacement information is the first predetermined value when the value of the delayed-replacement information of the cache line that has not been accessed for a longest period of time has a second predetermined value, and a number of instances that the cache line that has not been accessed for a longest period of time has been excluded from the search is less than or equal to a third predetermined value, and
the removing further comprises:
moving, by the first associative cache unit, the cache line that has not been accessed for a longest period of time to the second associative cache unit, when the value of the delayed-replacement information of the cache line that has not been accessed for a longest period of time is the second predetermined value, and the number of instances that the cache line that has not been accessed for a longest period of time has been excluded from the search is less than or equal to the third predetermined value.

9. The method of claim 7,
wherein the selecting comprises:
searching, by the first associative cache unit, a cache line among the first cache lines, that has not been accessed for a longest period of time; and
wherein the removing comprises:
selecting, by the first associative cache unit, one of the second associative cache unit and an external memory of a cache memory system, based on a value of delayed-replacement information of the cache line that has not been accessed for a longest period of time; and
moving, by the first associative cache unit, the cache line that has not been accessed for a longest period of time to the selected external memory or the selected second associative cache unit.

10. The method of claim 7,
wherein the selecting comprises:
searching, by the first associative cache unit, a cache line among the first cache lines, that has not been accessed for a longest period of time; and
wherein the removing comprises:
selecting, by the first associative cache unit, one of a plurality of sub-associative cache units, based on a value of delayed-replacement information of the cache line that has not been accessed for a longest period of time; and
moving, by the first associative cache unit, the cache line that has not been accessed for a longest period of time to the selected sub-associative cache unit,
wherein the second associative cache unit includes the plurality of sub-associative cache units.

11. The method of claim 10, wherein each of the plurality of sub-associative cache units stores a different number of cache lines.

12. The method of claim 7, wherein the first associative cache unit comprises one or more sets, each set stores k cache lines each, and the first cache lines correspond to k cache lines stored in a set corresponding to the access-requested address.

13. A non-transitory computer-readable medium comprising a program for instructing a computer to perform the method of claim 7.

* * * * *